(12) United States Patent
Kozu (10) Patent No.: US 6,486,870 B1
(45) Date of Patent: Nov. 26, 2002

(54) CHARACTER INPUT CONTROL EQUIPMENT

(75) Inventor: Akira Kozu, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/487,341

(22) Filed: Jan. 19, 2000

(30) Foreign Application Priority Data

Jan. 22, 1999 (JP) ............................................ 11-014841

(51) Int. Cl.$^7$ ................................................ G09G 5/08
(52) U.S. Cl. ....................... 345/157; 345/764; 345/773; 345/780; 341/22; 341/23; 341/26; 273/272; 273/299; 463/30; 463/31
(58) Field of Search ......................... 345/157, 168–172, 345/764, 773, 778, 780, 467–469, 856, 858, 827, 810, 835, 840; 341/22, 23, 26, 28; 273/272, 139, 299, 308; 463/30, 31, 37; 455/556, 566, 575

(56) References Cited

U.S. PATENT DOCUMENTS

| | | |
|---|---|---|
| 5,543,818 A | 8/1996 | Scott |
| 6,016,142 A * | 1/2000 | Chang et al. ............... 345/168 |
| 6,037,942 A * | 3/2000 | Millington .................. 345/156 |
| 6,232,969 B1 * | 5/2001 | Fawcett ...................... 345/467 |
| 6,295,052 B1 * | 9/2001 | Kato et al. .................... 341/21 |

FOREIGN PATENT DOCUMENTS

WO    WO 99/46563    9/1999

OTHER PUBLICATIONS

Abstract of JP 08 161097 A, published Jun. 21, 1996, Derwent Publications Ltd., London, GB, XP002136668.

* cited by examiner

Primary Examiner—Richard Hjerpe
Assistant Examiner—Henry N. Tran
(74) Attorney, Agent, or Firm—Dickstein Shapiro Morin & Oshinsky LLP (57) ABSTRACT

Character input control equipment enables the decrease of moving distance of a cursor between key positions and also enables efficient key input. The character input control equipment includes character input display field display controller for displaying a plurality of character input display fields in a display part, cursor movement controller for specifying one character input display field out of the plurality of character input display fields displayed in the display part by moving the cursor, and input character selector for selecting one character out of the plurality of characters corresponding to the one character input display field specified by the cursor movement controller wherein a plurality of characters correspond to each one of the plurality of character input display fields.

13 Claims, 5 Drawing Sheets

CHARACTER INPUT CONTROL EQUIPMENT

BACKGROUND OF THE INVENTION

1. Field of the Invention

The present invention relates to character input control equipment. More particularly, the present invention relates to character input control equipment to input characters which are displayed on a display screen, by using "soft" keys.

2. Description of the Related Art

Figure 6:
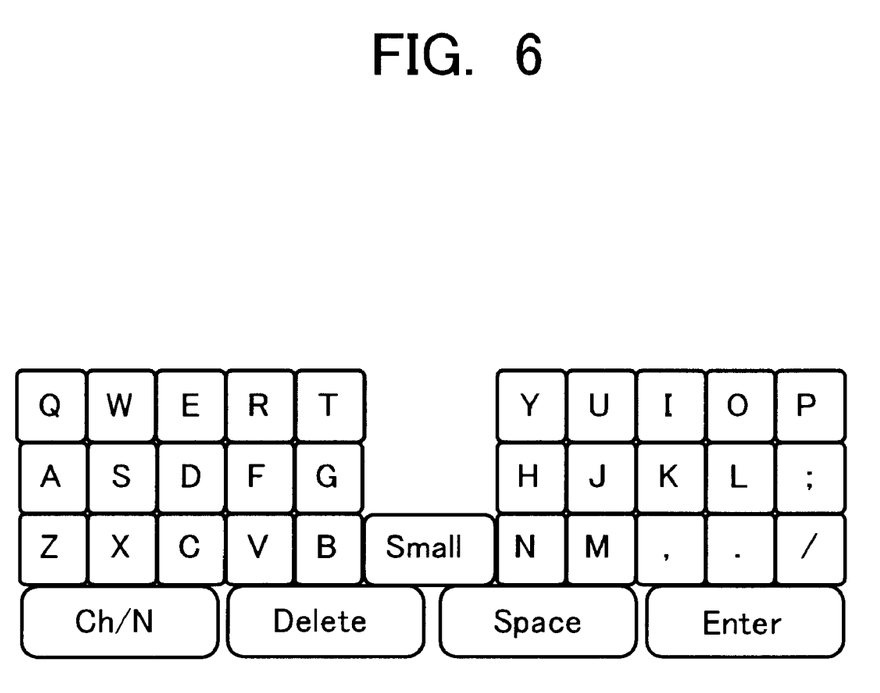
FIG. 6 is an example of the key array to be displayed on the display in direct input mode which is used for the conventional character input control method.

FIG. 6 shows an example of an array of a plurality of keys (hereafter called character input display field) which is displayed on the display in direct input mode for conventional character input control.

All alphabetical characters (A–Z) are arranged. Also a key to select lower case characters (small key) and an alphanumeric switching key (Ch/N) and other keys are also arranged. Using such key arrays, a player of a game machine inputs the name of a player, nickname of the operation target character of a match game, and other data according to the type of game.

When "DREAM" is input, for example, the cursor is moved to a plurality of key positions corresponding to "D", "R", "E", "A" and "M" so as to be positioned at a predetermined position, and the enter key is instructed to complete the input of "DREAM".

In recent game machines, on the other hand, program control enabling a match game with an opponent at a remote location or to enable conversations (chat) based on characters via communication lines is becoming possible.

In such a case, it is necessary for both players to input predetermined information prior to the start of the match game in order to communicate with the remote equipment. In the case of a chat via communication lines, characters must be input corresponding to the conversation.

Therefore when the above mentioned key array shown in FIG. 6 is used, the distance of cursor movement from a key position to be input to the next key position is large. For example, in order to input "A" after inputting "P", it is necessary to move the character cursor from the character "P" position to the character "A" position by passing 13 character positions.

However, in the case of a match game or chat via communication lines, quick character input is desirable to minimize an unnecessary increase in connect charges.

SUMMARY OF THE INVENTION

With the foregoing in view, it is an object of the present invention to provide a character input control equipment which enables efficient key input while decreasing the moving distance of the cursor between key positions.

To achieve this object, character input control equipment according to the present invention includes character input display field display control means for displaying a plurality of character input display fields in a display part, cursor movement control means for specifying one character input display field out of the plurality of character input display fields displayed in the above display part by moving a cursor, and input character select means where a plurality of characters correspond to each one of the above plurality of character input display fields, and one character is selected out of the plurality of characters corresponding to one character input display field specified by the cursor movement control means.

An aspect of the present invention is characterized in that the movement of the cursor by the above cursor movement means and the selection of one character by the above input character select means are controlled according to control by a player.

Another aspect of the present invention is characterized in that a character input control equipment comprises character input display field display control means for displaying a plurality of character input display fields in a display part, cursor movement means for specifying one character input display field out of the plurality of character input display fields displayed in the display part by moving a cursor according to control by a player, and input character conversion means, where a first code and a plurality of second codes belonging to the first code correspond to each one of the above plurality of character input display fields, the first code and one second code out of the plurality of second codes belonging to the first code corresponding to one character input display field specified by the cursor movement means are selected, and the combination of the above specified first code and the selected code of the second codes is converted to a corresponding character.

Another aspect of the present invention is characterized in that the movement of the cursor by the cursor movement means and the selection of the above one second code are controlled according to control by a player.

The plurality of character input display fields displayed in the above display part are arranged such that one reference character input display field comes to the center, and the cursor is moved by the cursor movement means from the position of this one reference character input display field.

The present invention is characterized in that the above cursor movement means controls so as to return the cursor to the position of the above reference character input display field when the cursor movement from the position of the above one reference character input display field ends.

The present invention is also characterized in that the character type change means for changing the character type corresponding to the above plurality of character input display fields is included.

Other characteristics of the present invention will be clarified by the embodiments of the present invention, which will be explained with reference to the accompanying drawings.

BRIEF DESCRIPTION OF THE DRAWINGS

FIG. 1 is a block diagram depicting a configuration of an embodiment of a video game machine which the present invention is applied to;

FIG. 3 is an operation flow to explain an input operation of an embodiment of a game machine which the character input control equipment of the present invention is applied to;

DESCRIPTION OF THE PREFERRED EMBODIMENTS

Figure 1:
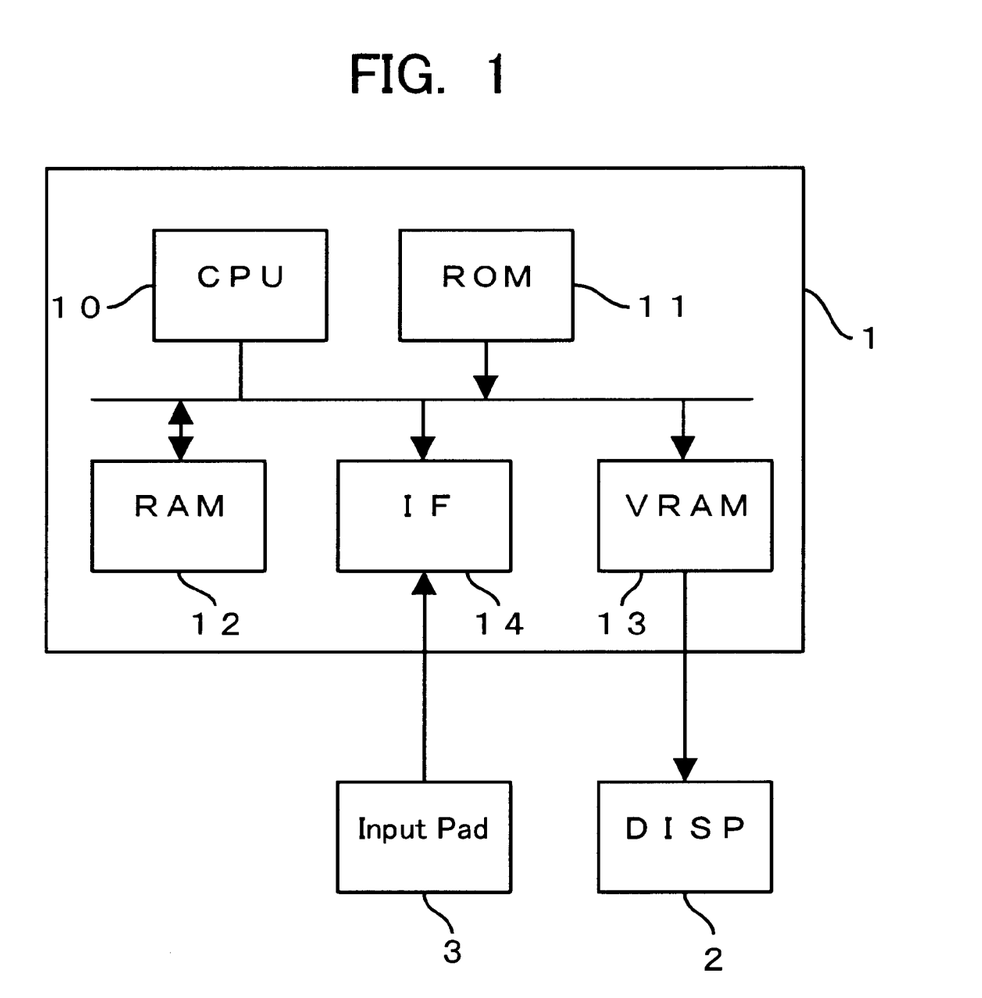

FIG. 1 is a block diagram depicting a configuration of an embodiment of a video game machine which the character input control equipment of the present invention is applied to. In FIG. 1, the game machine main unit 1 has a CPU 10, a ROM 11 where the game program to be executed by the CPU 10 is stored, a RAM 12 to store data for operation and a video RAM 13 where one frame of image data to be displayed on the display 2 is stored.

The game machine main unit 1 also has an interface 14 to be connected to an input pad 3. Alphabet input to be controlled by the present invention is executed by the input pad 3 to be connected to the game machine main unit 1.

The program to implement the functions of the character input control equipment of the present invention is, for example, included in the game program to be stored in the ROM 11.

Figure 2:
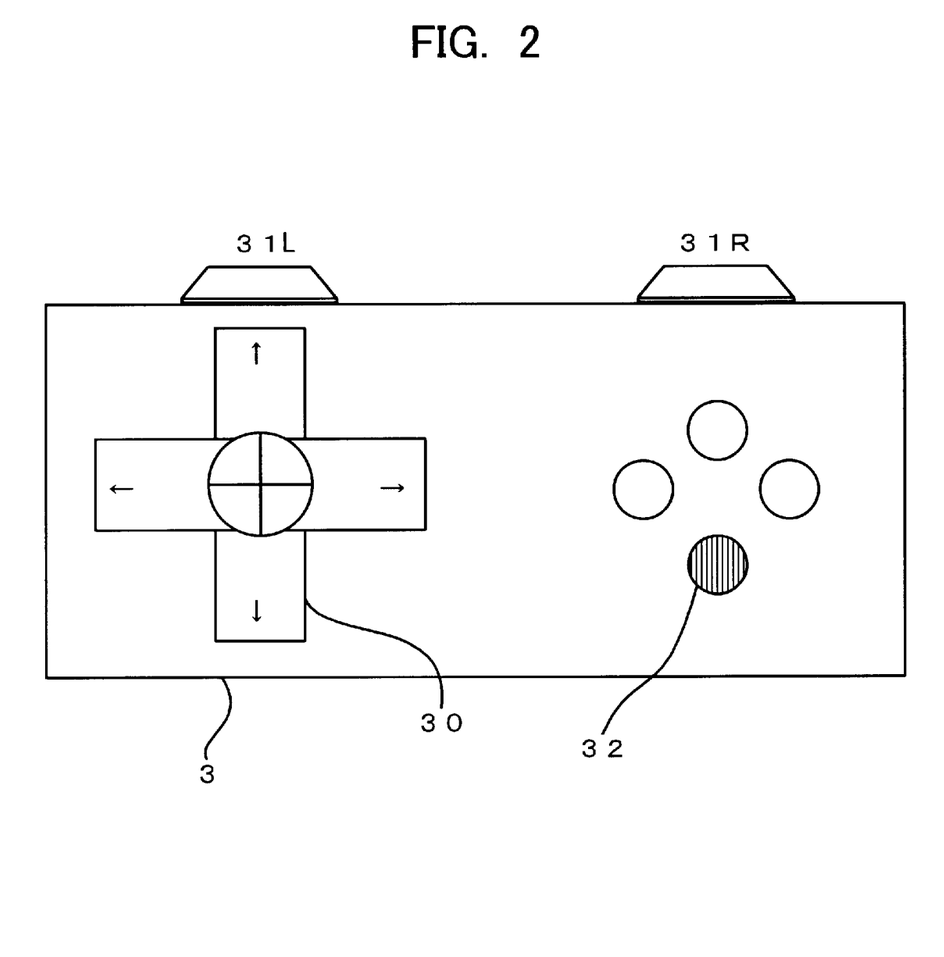
FIG. 2 is a drawing depicting a rough configuration of an embodiment of an input pad 3.

FIG. 2 is a drawing depicting a rough configuration of an embodiment of the input pad 3. The shape of the input pad 3 varies, but has a cursor movement control switch 30 to instruct the movement and direction of the cursor, a character type select switch 31L, a character input display field group select switch 31R, and a character select or code element select switch 32 as the character input control equipment of the present invention.

In the following embodiment, the cursor movement function and select function are implemented by the CPU 10 which processes the switch signals output by each switch pressing operation, using the game program stored in the ROM 11 in the character input control equipment of the present invention.

Therefore in the following description, the present invention is described primarily in terms of each switch operation and display change on the display 2 based on the switch operation, assuming that CPU 10 executes processing based on the switch signals which are output by each switch pressing operation.

The cursor movement control switch 30 controls the movement of the cursor vertically or horizontally. The character type select switch 31L switches the input character type, that is, alphabetic characters and numeric characters, each time it is pressed.

The character input display field group select switch 31R, on the other hand, is used to select the character input display field group, as described later, and the alphabetic character select or code element select switch 32 is used to select one alphabetic character of a plurality of alphabetic character groups belonging to a same character input display field position.

Figure 3:
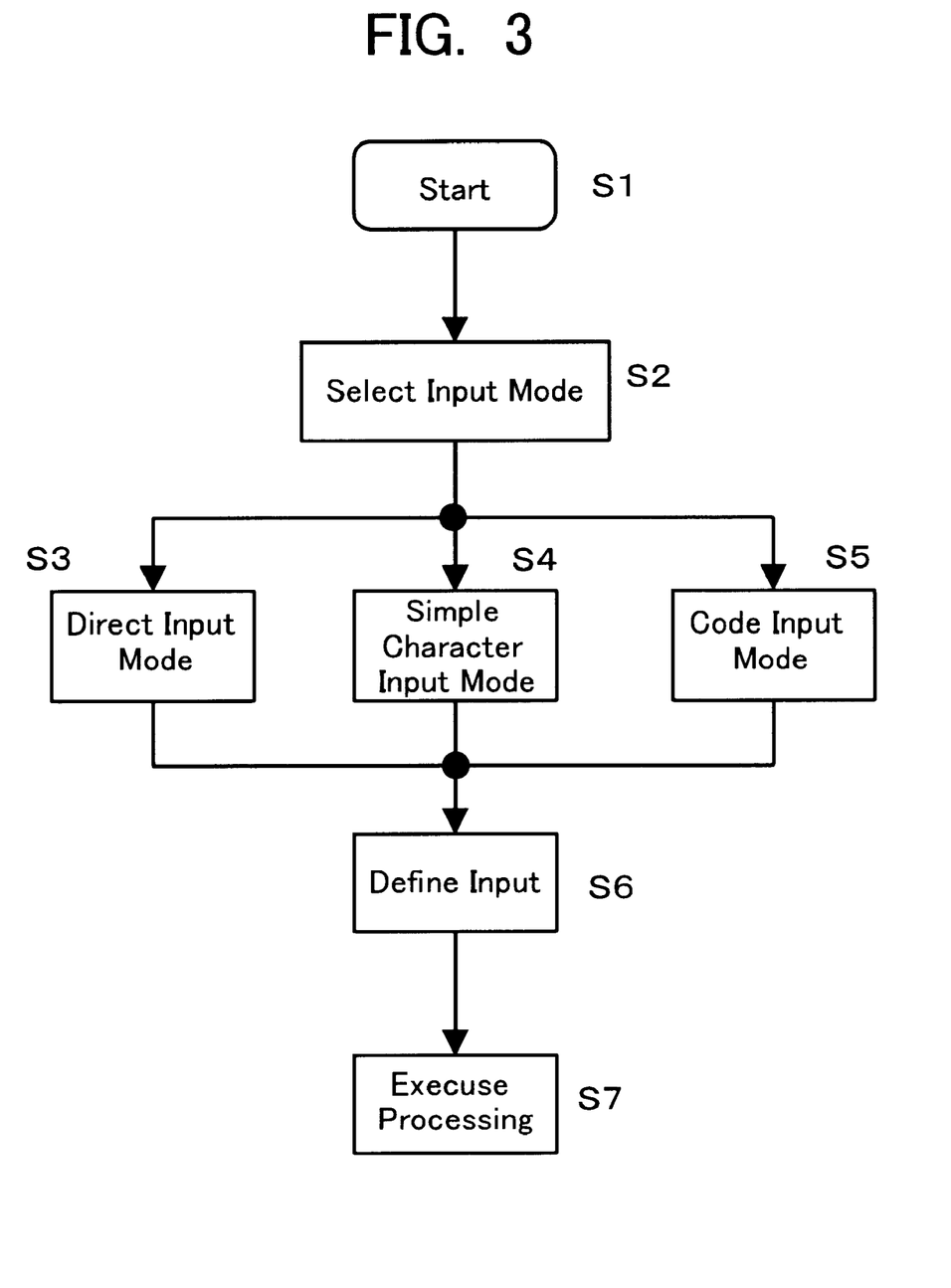

FIG. 3 is an operation flow chart depicting the alphabetic character input in a game machine to which the character input control equipment of the present invention is applied. When the game machine starts (Step S1), input mode select processing (Step S2) is executed.

In other words, the input mode select screen is displayed on the screen of the display, which is not illustrated. The player can now select an input mode from direct input mode (Step S3), simple character input mode (Step S4) and code input mode (Step S5).

In the direct input mode (Step S4), the conventional input method described in FIG. 6 is used. Therefore if the player selects the direct input mode, the input key array shown in FIG. 6 is displayed.

In this case, the player can move the cursor to the key position of the desired character to be input, and can define the input by controlling the cursor movement control switch 30 and the character type select switch 31L.

When the cursor movement switch 30 is set to non-pressed status next, the input of the alphabetic character corresponding to the key position where the cursor is placed is defined. Input of an alphabetic character may be defined when input is executed next, not when the cursor movement control switch 30 is set to non-pressed status. This is the same for the following embodiments.

Figure 4A:
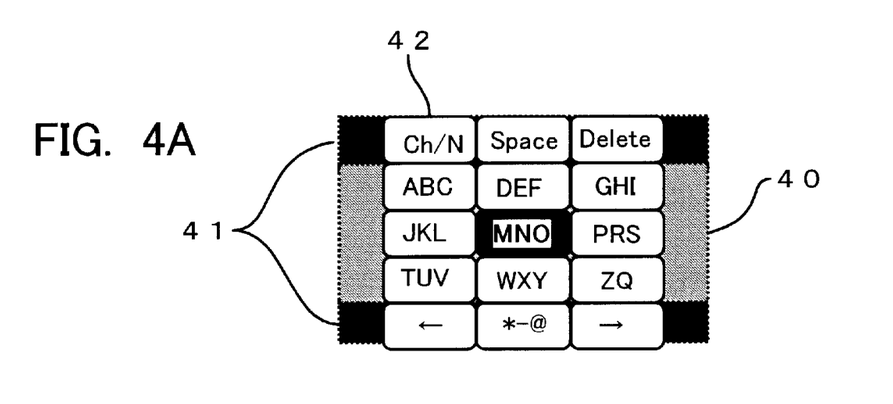
FIGS. 4A and 4B are drawings depicting an example of the input key array in alphabet input mode.
Figure 4B:
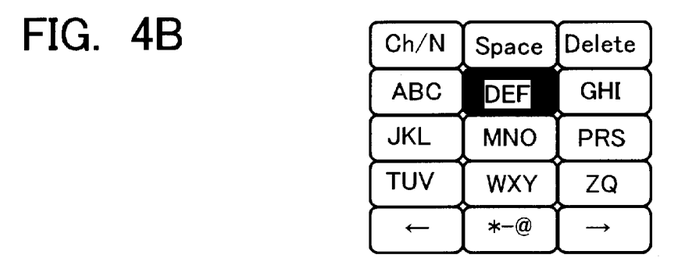

When a player selects the simple character input mode (Step S4) in FIG. 3, the CPU 10 displays the input key array shown in FIGS. 4A and 4B as a control part. This input key array constitutes a first character input display field group 40 where alphabetic character keys, which are a plurality of character input display fields, are arranged. Outside this first character input display field group 40, the second character input display field group 41 is arranged.

Selection of the first character input display field group 40 and the second character input display field group 41 are switched by pressing the character input display field group select switch 31R shown in FIG. 2.

In the example in FIGS. 4A and 4B, each key corresponds to one alphabetic character group, which includes three alphabetic characters, and the alphabetic character group "MNO" is displayed at the center of the array as the reference character input display field group. Also in initial status, as shown in FIG. 4A, the cursor is on the character input display field group of the alphabetic character group "MNO".

Here the character input display field 42, belonging to the second character input display group 41 is a key to switch the input character type from alphabetic to numeric characters.

Now an embodiment when "F", "@", "N", "K" and "P" are input in the character input control equipment of the present invention in the key array shown in FIG. 4A will be explained. In the initial status, the character input display field 42 selects the alphabetic input.

The alphabetic character "F" belongs to the alphabetic character group "DEF". Therefore the player selects the first character input display field group 40 by pressing the character input display field group select switch 31R. Then the player shifts the cursor upward by pressing the cursor movement control switch 30. By this, the cursor can be positioned at the character input display field position for the alphabetic character group "DEF".

At this time, CPU 10 displays the alphabetic character "D" on the screen of the display 2, which is not illustrated. Then in order to select the alphabetic character "F" out of the plurality of alphabetic characters "D", "E" and "F" belonging to the character input display field group "DEF", the player presses the character select or code element select switch 32 two times in the sequence of "D", "E" and "F". By this, the alphabetic characters are shifted from "D" and "E" to "F" and are displayed on the screen of the display 2.

When the alphabetic character "F" is displayed, the cursor movement control switch 30 is set to non-pressed status. By this, the selection of the alphabet "F" is defined and input of the corresponding character code is defined.

A characteristic of the present invention here is that the CPU 10 simultaneously controls such that the cursor is returned to the home key position of the alphabetic characters "MNO", which is the reference character input display field group.

When the symbol "@" is input, the player switches to the second character input display field group 41 by pressing the character input display field group select switch 31R. Then when the cursor movement control switch 30 is pressed in the right direction, the cursor is shifted to the display field position to input symbols "*–@".

At this time the symbol "*" is displayed. "*", "−" and "@" are the symbols belonging to the display field to input symbols "*−@". Therefore the player presses the character select or code element select switch 32 twice in the group of the symbols "*−@", to shift the display on the screen of the display 2 from "*", "−" to "@".

Then the cursor movement control switch 30 is set to non-pressed status when the symbol "@" is displayed. By this, input of the symbol "@" is defined. At the same time, the CPU controls the cursor to return to the character input display field position for the alphabetic character group "MNO", which is the center position of the matrix.

When the alphabetic character "N" is input, the cursor does not have to be moved from the reference character input display field position, since the alphabetic character group "MNO" is the group where the alphabetic character "N" belongs in the display status shown in FIG. 4A.

So the player presses the character select or code element select switch 32 once, to shift the alphabetic character from "M" to "N". By this, the alphabetic character "N" is input.

To input the alphabetic character "K", the cursor is shifted to the left by the cursor movement control switch 30 to select the character input display field position for the alphabetic character group "JKL". Then the character select or code element select switch 32 is pressed to shift the alphabetic character from "J" to "K". When the cursor movement control switch 30 is set to non-pressed status, the cursor is returned to the character input display field position for the alphabetic character group "MNO".

To input the alphabetic character "P" next, the cursor is shifted to the right to select the character input display field position for the alphabetic character group "PRS". When the cursor movement control switch 30 is set to non-pressed status, the alphabetic character "P" is input, and the cursor is returned to the character input display field position of the alphabetic character group "MNO".

In this way, input of "F@NKP" is defined (Step S6). Then the following processing is executed according to the game program stored in the ROM 11 (Step S7).

Figure 5:
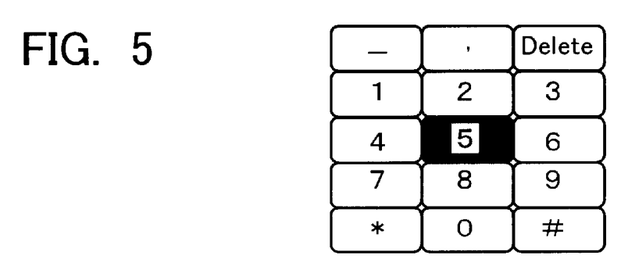
FIG. 5 is a drawing depicting an example of the input key array in numeric input mode.

FIG. 5 is another embodiment of the present invention depicting a key array displayed on the display 2 when the numeric character input mode (Step S5) is selected in FIG. 3. This numeric character input mode is selected by pressing the character type select switch 31L in FIG. 2.

In the input key array in FIG. 5, numeric keys are arranged as a plurality of character input display fields in odd number columns and odd number rows, and the numeric "5" is displayed in the character input display field position at the center of the array. In the initial status, the cursor is on the numeric "5".

Now the operation to input "F", "@", "N", "K" and "P" by the character input control equipment of the present invention in the array of the character input display field shown in FIG. 5 is explained. In the input during numeric character input mode, the alphabetic characters "A"–"Z" are represented by one of the numeric character codes "00"–"99" respectively. Therefore 100 types of characters can be input by 10 keys, that is, by character input display fields.

"F", for example, of the alphabetic characters "F", "@", "N", "K" and "P", is represented by the code "25", where the first code element is "2" and the second code element is "5". In the same way, the symbol "@" is represented by the code "02", where the first code element is "0" and the second code element is "2", "N" is represented by the code "52" where the first code element is "5" and the second code element is "2", "K" is represented by the code "42", where the first code element is "4" and the second code element is "2", and "P" is represented by the code "61" where the first code element is "6" and the second code element is "1".

Therefore to input the alphabetic character "F", the player shifts the cursor upward by the input character display field group select switch 31R and the cursor movement control switch 31. By this, the cursor can be positioned at the character input display field position for the numeric character "2".

At this time, the numeric character code "21", which is comprised of the first code element "2" and the second code element "1" corresponding to the alphabetic character "D", is output from the input pad 3, and the CPU 10 displays the alphabetic character "D" on the screen of the display 2, which is not illustrated.

So when the player presses the character select or code element select switch 32 twice to select the second code element, the numeric character codes "22" and "23" are sequentially output from the input pad 3. Corresponding to this, the CPU 10 shifts the display on the screen of the display 2 sequentially from "D" and "E" to "F".

When the alphabetic character "F" is displayed, the cursor movement control switch 30 is set to non-pressed status. By this, the alphabetic character "F" is defined and input. At the same time, the CPU 10 controls the cursor to return to the key position of the numeric character "5", which is the reference character input display field at the center position of the matrix.

When the symbol "@" is input, the cursor is shifted to the input character display field position of the numeric character "0" by the cursor movement control switch 30 and the character type select switch 31L.

At this time, the numeric code "01" corresponding to the symbol "@" is output, and the corresponding symbol "@" is displayed. Therefore the player presses the character select or code element select switch 32 twice in the group of the numeric character key "0", that is, the group where the first code element "0" belongs, to output the numeric character codes "01" and "02", and shifts the display of the screen of the display 2 from the symbol "*" and "−" to "@".

Then the cursor movement control switch 30 is set to non-pressed status. By this, the alphabetic character "@" is input. At the same time, the CPU 10 controls the cursor to return to the character input display field position for the numeric character "5" at the center position of the matrix.

To input the alphabetic character "N" next, the cursor does not have to be moved since the group where the alphabetic character "N", represented by the numeric character code "51", is the alphabetic character group "MNO" in the display status shown in FIG. 5.

So the player presses the character select or code element select switch 32 once to shift the numeric character code from "51" to "52". By this, the alphabetic character is shifted from "M" to "N" and the alphabetic character "N" is input.

To input the alphabetic character "K", the cursor is shifted to the left to select the alphabetic character group "JKL", represented by the numeric character code "41". Then the numeric character code is shifted from "41" to "42" by the character select or code element select switch 32 to select the corresponding alphabetic character "K". When the cursor movement control switch 30 is set to non-pressed status, the cursor is returned to the character input display field position for the numeric character "5".

To input the next alphabetic character "P", the cursor is shifted to the right to select the alphabetic character group "PRS", represented by the numeric character code "61". When the cursor movement control switch 30 is set to non-pressed status, the alphabetic character "P" is input, and the cursor is returned to the reference character input display field position for the numeric character "5".

In this way, the input of "F@NKP" is defined. Then, the following processing is executed according to the game program stored in the ROM 11.

In the code input mode according to the above embodiment of FIG. 5, it is possible to control such that only the code numeric character corresponding to the first code element is displayed in the process before selecting the second code element from the group belonging to the first code element.

This means that if the alphabetic character "B" is allocated to the code "12", the numeric character "1" is displayed when the first code element "1" is selected, and the alphabetic character "B" is displayed when the second code element "2" is selected and defined. At this time, an accurate character input can easily be confirmed by changing the display colors of the numeric character "1" and the alphabetic character "B".

In the present invention, as explained according to the above embodiment, the cursor is returned to the reference input character display field position at the center of the key array when the input of one character is defined. This makes it possible to minimize the cursor movement distance to input the next character, no matter which alphabetic character is input next.

Therefore, it becomes possible to efficiently execute a match game and chat with remote equipment at a distant location via communication lines by applying the present invention.

In the description of the above embodiment, the input of alphabetic characters was used as an example, but the application of the present invention is not restricted by this. Needless to say, the present invention can be applied to the input of characters and symbols of other languages, such as Kanji, Hangul and Russian.

What is claimed is:

1. A character input control system comprising:
a controller for controlling the display of a plurality of character input display fields on a display unit such that one of said plurality of character input display fields is positioned in a central location relative to the other of said plurality of character input display fields, said controller also controlling cursor movement for specifying one character input display field out of the plurality of character input display fields displayed on said display unit, said cursor initially being located at said central location position of said one character input display field and is moveable by said controller from the central location position to said other of said plurality of character input display fields, and wherein said controller controls cursor movement such that said cursor returns to said central location position when cursor movement from said central location position ends; and
an input character selector for selecting one character out of a plurality of characters corresponding to a specified character input display field.

2. The system according to claim 1, further comprising a character type select switch for changing a character type of characters corresponding to said plurality of character input display fields.

3. The system according to claim 1, wherein said controller controls cursor movement in response to receiving commands from a player.

4. The system according to claim 3, wherein the plurality of character input display fields displayed on said display unit includes a first character input display field group which includes said one character input display field positioned in said central location and a second character input display field group having at least one character input display field which is arranged outside said first character input display field group.

5. The system according to claim 4, further comprising a display field group selector for selecting either said first character input display field group or said second character input display field group, wherein the cursor is moved to the second character input display field group from said one character input display field positioned at said central location when said second character input display field group is selected.

6. A character input control system comprising:
a controller for controlling the display of a plurality of character input display fields on a display unit such that one of said plurality of character input display fields is positioned in a central location relative to the other of said plurality of character input display fields;
said controller also controlling cursor movement for specifying one character input display field out of the plurality of character input display fields displayed on said display unit by moving a cursor according to control by a player, wherein the cursor is initially located at said central location position of said one character input display field and is moveable by said controller from the central location position to said other of said plurality of character input fields and the cursor returns to said central location position when cursor movement from said central location position ends; and wherein
said controller controls the selection of a first code and one second code out of a plurality of second codes corresponding to said first code, said first code and said plurality of second codes corresponding to one character input display field on said display unit as specified by said cursor, said controller also controls the conversion of the combination of said first code and said selected one of the second codes to a corresponding character.

7. The system according to claim 6, wherein the plurality of character input display fields displayed on said display unit includes a first character input display field group which includes said one character input display field positioned in said central location and a second character input display field group having at least one character input display field which is arranged outside said first character input display field group.

8. The system according to claim 7, further comprising a display field group select means for selecting either said first character input display field group or said second character input display field group, wherein the cursor is moved to the second character input display field group from said one character input display field positioned at said central location when said second character input display field group is selected.

9. A character input control method, the method comprising:
displaying a plurality of character input display fields with one of said plurality of character input display fields being positioned in a central location relative to the other of said plurality of character input display fields;

moving a cursor from an initial location at said centrally located character input display field to specify another character input display field out of said plurality of character input display fields;

defining an input of a character corresponding to said specified character input display field; and returning said cursor to the initial location at said centrally located character input display field.

10. The method according to claim 9, wherein said act of moving further comprises specifying one character of a plurality of characters belonging to the specified character input display field, by sequentially shifting the cursor onto said plurality of characters until a desired character is specified.

11. The method of claim 9, wherein said act of defining comprises converting a combination of a first code and a second code corresponding to the first code, to a character, wherein the combination is associated with the specified character input display field.

12. A game machine comprising:

a main unit having a controller to control the display of a plurality of character input display fields on a display unit with one of the plurality of character input display fields being positioned in a central location relative to the other of said plurality of character input display fields; and an input pad which is connectable to said main unit and has a cursor movement control switch, a character select switch and a character type select switch, wherein said controller controls movement of the cursor in response to a user pressing said cursor movement control switch to specify one character input display field out of said plurality of character input display fields, said controller also controls the defining of the input of the character corresponding to said specified character input display field when said cursor movement control switch is set to non-pressed status, and wherein said controller also controls the return of said cursor to the one centrally located character input display field.

13. A recording medium storing a game program to be executed by a video game machine, wherein said game program operates said video game machine to:

display a plurality of character input display fields with one of said plurality of character input display fields being positioned in a central location relative to the other of said plurality of character input display fields;

move a cursor in response to a user's pressing a cursor movement control switch to specify one character input display field out of said plurality of character input display fields;

define an input of a character corresponding to said specified character input display field when said cursor movement control switch is set to non-pressed status; and return said cursor to the one centrally located character input display field.

* * * * *